United States Patent
Suzuki et al.

(10) Patent No.: US 9,217,612 B2
(45) Date of Patent: Dec. 22, 2015

(54) TEMPERATURE MONITOR OF WIRE ELECTRIC DISCHARGE MACHINE

(71) Applicant: FANUC CORPORATION, Yamanashi (JP)

(72) Inventors: Koji Suzuki, Yamanashi (JP); Shouta Irie, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 325 days.

(21) Appl. No.: 13/952,994

(22) Filed: Jul. 29, 2013

(65) Prior Publication Data
US 2014/0034265 A1   Feb. 6, 2014

(30) Foreign Application Priority Data
Aug. 1, 2012   (JP) ................................. 2012-171230

(51) Int. Cl.
G08B 21/00   (2006.01)
F28F 27/00   (2006.01)
G01K 3/00   (2006.01)
G01K 13/02   (2006.01)
F25B 49/00   (2006.01)

(52) U.S. Cl.
CPC ................ *F28F 27/00* (2013.01); *G01K 3/005* (2013.01); *G01K 13/02* (2013.01); *F25B 49/005* (2013.01)

(58) Field of Classification Search
USPC ......................................................... 340/540
See application file for complete search history.

(56) References Cited

U.S. PATENT DOCUMENTS

| | | | | |
|---|---|---|---|---|
| 4,376,510 A * | 3/1983 | Allard | ........................... | 237/2 B |
| 4,408,113 A * | 10/1983 | Inoue | ......................... | 219/69.17 |
| 4,730,094 A * | 3/1988 | Aramaki et al. | ........... | 219/69.14 |
| 5,150,102 A * | 9/1992 | Takashima | .................... | 340/584 |
| 2009/0093917 A1 * | 4/2009 | Smith | ........................... | 700/300 |
| 2014/0318152 A1 * | 10/2014 | Ghoshal et al. | .................. | 62/3.2 |

FOREIGN PATENT DOCUMENTS

| | | |
|---|---|---|
| CN | 102019471 A | 4/2011 |
| JP | 62114825 A | 5/1987 |
| JP | 62181827 A | 8/1987 |
| JP | 2-116418 A | 5/1990 |
| JP | 4-82624 A | 3/1992 |
| JP | 7-51946 A | 2/1995 |
| JP | 2640682 B2 | 8/1997 |
| JP | 9216131 A | 8/1997 |
| JP | 2003-94253 A | 4/2003 |
| JP | 2007-307661 A | 11/2007 |
| JP | 2010105101 A | 5/2010 |

OTHER PUBLICATIONS

Office Action issued Mar. 4, 2015, corresponding to Chinese patent application No. 201310331938.7.
Decision to Grant a Patent mailed Aug. 27, 2013 corresponds to Japanese patent application No. 2012-171230.

* cited by examiner

*Primary Examiner* — Naomi Small
(74) *Attorney, Agent, or Firm* — Hauptman Ham, LLP (57) ABSTRACT

A wire electric discharge machine that machines a workpiece by supplying a working fluid to a work tank where the workpiece is placed includes a temperature monitor, which exercises control so that the temperature of the working fluid is within a predetermined range. An alarm is displayed when the temperature of the working fluid is outside an allowable temperature range. A time that has elapsed since the temperature of the working fluid falls within the allowable temperature range from outside the allowable temperature rage is measured and when the measured time exceeds a preset working fluid temperature difference disappearing time, the alarm is called off.

6 Claims, 10 Drawing Sheets

(a) MATERIAL A OF WORK

| TEMPERATURE DIFFERENCE \ V (VOLUME) / S (SURFACE AREA) | 1 | 2 | 3 | 4 | 5 | 6 | ... |
|---|---|---|---|---|---|---|---|
| 0 | | | | | | | |
| 2 | | | | | | | |
| 4 | | | | | | | |
| 6 | | | | | | | |
| : | | | | | | | |
| : | | | | | | | |

(b) MATERIAL B OF WORK

| TEMPERATURE DIFFERENCE \ V (VOLUME) / S (SURFACE AREA) | 1 | 2 | 3 | 4 | 5 | 6 | ... |
|---|---|---|---|---|---|---|---|
| 0 | | | | | | | |
| 2 | | | | | | | |
| 4 | | | | | | | |
| 6 | | | | | | | |
| : | | | | | | | |
| : | | | | | | | |

TEMPERATURE MONITOR OF WIRE ELECTRIC DISCHARGE MACHINE

RELATED APPLICATIONS

The present application is based on, and claims priority from, Japanese Application Number 2012-171230, filed Aug. 1, 2012, the disclosure of which is hereby incorporated by reference herein in its entirety.

BACKGROUND OF THE INVENTION

1. Field of the Invention

The present invention relates to a temperature monitor of a wire electric discharge machine. More specifically, the present invention relates to a temperature monitor of a wire electric discharge machine that monitors the temperature of a working fluid or the temperature around an electric discharge machine (outside air temperature), displays an alarm when the monitored working fluid temperature or outside air temperature is outside a predetermined range, and calls off the alarm after the monitored temperature returns to within the predetermined range and a temperature difference between the working fluid and a workpiece or a temperature difference between the outside air temperature and the electric discharge machine body disappears.

2. Description of the Related Art

A wire electric discharge machine machines a workpiece into a desired shape by causing a discharge by applying a voltage to a machining gap between a wire electrode and a workpiece and at the same time, changing a relative position of the wire electrode with respect to the workpiece. In general, the dimensional precision, perpendicularity, or precision of angle is required from machining results of a workpiece.

In wire electric discharge machining, the required machining precision changes depending on conditions such as the material, thickness and the like of a workpiece and in some cases, high precision of a few micrometers is required. Thus, if the temperature of the working fluid or around the wire electric discharge machine changes and the workpiece or the electric discharge machine body is deformed during machining, the machining precision deteriorates and the dimension error may become larger than an allowable value. Therefore, it is important to control the working fluid temperature or the temperature around the electric discharge machine to obtain a desired machining result from the electric discharge machine.

Regarding the temperature control of electric discharge machining, Japanese Patent Application Laid-Open No. 4-82624 discloses a technology of machining while controlling the working fluid temperature and the outside air temperature to within a predetermined temperature range by managing the working fluid temperature and the temperature around an electric discharge machine (outside air temperature). The technology relate to controlling of working fluid temperature and temperature around an electric discharge machine while the electric discharge machine is in operation.

A case where a wire electric discharge machine restarts to work after pausing for a predetermined time will be considered. It is assumed that the wire electric discharge machine is without human intervention during pausing and no machine operation is performed by humans. It is also assumed that the temperature control unit of the working fluid and air conditioner stop while the wire electric discharge machine pauses and the wire electric discharge machine operates with the minimum power to maintain the machine.

First, the temperature change of the working fluid will be considered.

If the temperature around the electric discharge machine (outside air temperature) is lower than a control target temperature of the working fluid in a normal operation state (such control target temperature is hereinafter referred to as control temperature), the temperature of the working fluid gets closer to the outside air temperature when the electric discharge machine pauses and after the pause state ends and the electric discharge machine restarts to work, the temperature of the working fluid is controlled to a control temperature. In the meantime, the state of the electric discharge machine is classified into the following four states (See FIG. 9). "Control temperature" below means the optimum control target temperature to machine a workpiece by a wire electric discharge machine.

Figure 9:
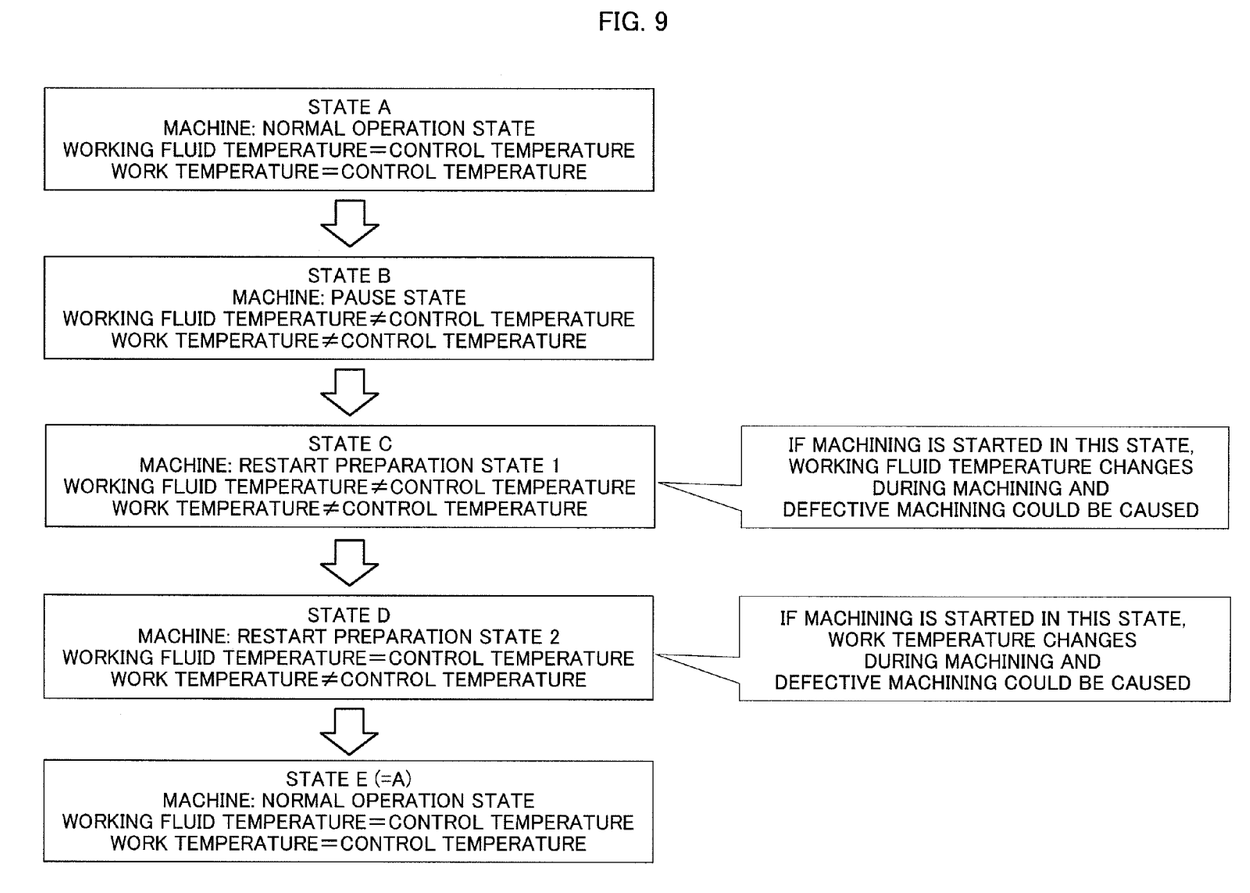
FIG. 9 is a diagram showing transitions of an electric discharge machine according to conventional technology like a normal operation state A, a pause state B, a restart preparation state C, a state D in which there is a temperature difference between the workpiece and working fluid, and a normal operation state E (=A)

A: A normal operation state in which the working fluid temperature is maintained at control temperature B: A pause state in which the temperature control unit of the working fluid stops C: A preparation state to restart an operation from the pause state in which the temperature control of the working fluid is restarted by the temperature control unit and a working fluid circulating pump D: A state immediately after the working fluid temperature becomes equal to the control temperature in which there is a temperature difference between the workpiece and working fluid E: A state returning to the normal operation state after the temperature difference between the workpiece and working fluid disappears (this state E is the same as the above state A).

If, in the operation restart preparation state C described above, machining is started before the temperature of the working fluid reaches the control temperature, the working fluid temperature will be different before machining and after machining. The workpiece is deformed as the temperature of the working fluid changes, causing defective machining.

Here, application of the technology described in Japanese Patent Application Laid-Open No. 4-82624 described above to the above restart preparation state C is considered.

According to the air-conditioning management method of a wire electric discharge machine described in the above Patent Document, an alarm signal is issued if the working fluid temperature or the room temperature is not within a predetermined temperature range when a predetermined time passes after power-on and the electric discharge machine is activated to start an operation if the working fluid temperature and the room temperature are within the predetermined temperature range. However, this air-conditioning management method issues an alarm warning to determine whether a working fluid cooling apparatus or an air conditioner is defective or not. Moreover, according to the air-conditioning management method, machining is immediately started when the working fluid temperature or the room temperature falls within the predetermined temperature range. That is, the technology is not intended to start an operation after waiting until a temperature difference between the electric discharge machine or workpiece and the working fluid or outside air disappears.

In addition, an abnormal condition display system of the working fluid temperature of a wire electric discharge machine that uses two temperature sensors and displays an alarm or stops machining when the working fluid temperature falls outside the predetermined temperature range due to a failure of cooler or an operator's failure to press a switch is disclosed in Japanese Patent Application Laid-Open No. 2-116418. If the technology of the abnormal condition display system of the working fluid temperature is used, an alarm is raised if an attempt is made to start machining when the working fluid temperature is outside the predetermined temperature range like the above operation restart preparation state C and therefore, machining can be performed only when the working fluid temperature is within the predetermined temperature range and the working fluid temperature does not change during machining.

Even if the technology disclosed in Japanese Patent Application Laid-Open No. 2-116418 described above is used, the workpiece or electric discharge machine body may thermally be deformed during machining. For example, immediately after the working fluid temperature or the ambient temperature of the wire electric discharge machine (outside air temperature) returns from outside the predetermined temperature range to inside the predetermined temperature range, there may be a temperature difference between the working fluid temperature or outside air temperature and the workpiece or electric discharge machine body. Though the temperature difference decreases and disappears over time, but if electric discharge machining is started before the temperature difference disappears, the temperature of the workpiece or electric discharge machine body will change during machining so that thermal deformation may arise due to the change of temperature of the workpiece during machining.

Figure 10:
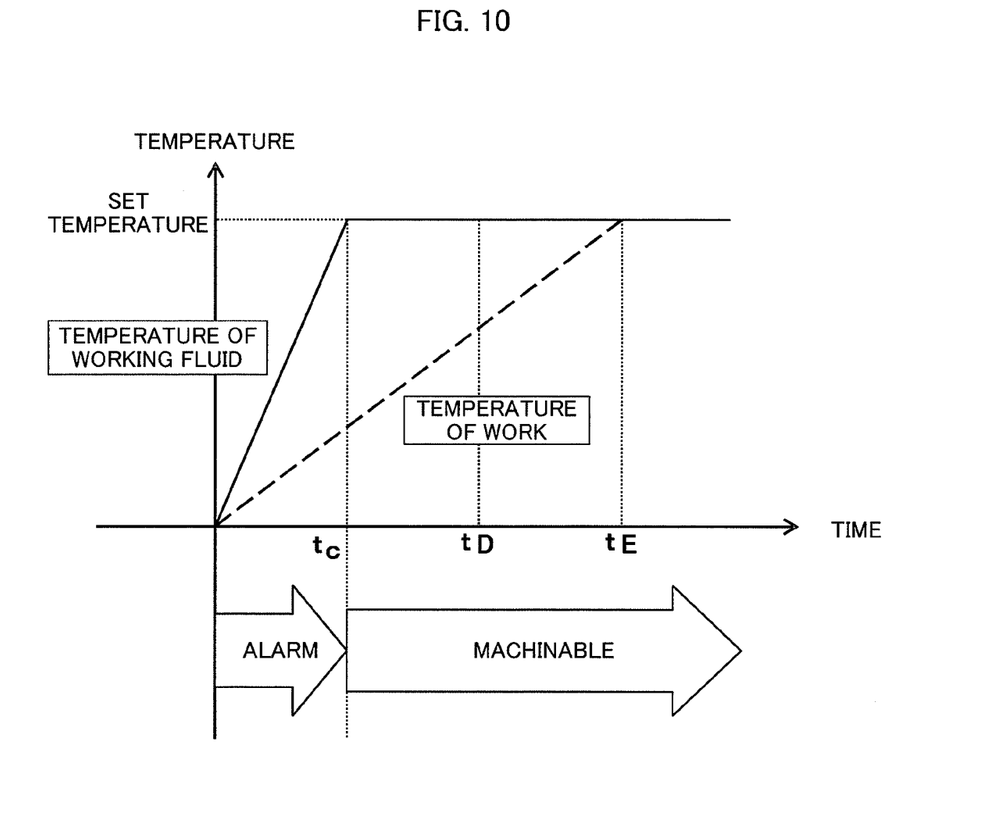
FIG. 10 is a diagram schematically showing temperature changes of the working fluid and workpiece when a wire electric discharge machine restarts to operate from a state of pause.

FIG. 10 is a diagram schematically showing temperature changes of the working fluid and workpiece when a wire electric discharge machine restarts to operate from a state of pause.

In FIG. 10, a solid line represents the work fluid temperature and a broken line represents the temperature of the workpiece. Characteristics such as thermal conductivity are different in the working fluid and the workpiece and thus, when the wire electric discharge machine restarts to operate, times necessary for respective temperatures to reach a set temperature are different. That is, in FIG. 10, while the working fluid temperature reaches the set temperature at $t_c$, the temperature of the workpiece reaches the set temperature at $t_E$. If, for example, electric discharge machining is started at time $t_E(t_c<t_D<t_E)$, the temperature of the workpiece changes during machining and thermal deformation is caused, leading to defective machining.

Similar consideration also applies to the change of outside air temperature around the electric discharge machine. If machining of the workpiece is started after an air conditioner is restarted to operate from the state of pause and before the ambient temperature of the wire electric discharge (outside air temperature) reaches the set temperature, the temperature of the machine body of the wire electric discharge machine is different between when machining is started and when machining is finished. This means that the machine itself is thermally deformed with temperature changes of the outside air temperature, causing defective machining.

Thus, a conventional wire electric discharge machine is configured to start machining even in a state in which the temperature of a workpiece or electric discharge machine body can change. This can cause defective machining, posing a problem of declining efficiency with an increasing number of man-hours due to repeated machining.

SUMMARY OF THE INVENTION

In view of the problem of the conventional technology, an object of the present invention is to provide a temperature monitor of a wire electric discharge machine that inhibits machining of a workpiece from starting by displaying an alarm on the assumption that the temperature of the workpiece or the electric discharge machine body can change when the temperature of a working fluid or the temperature around the electric discharge machine (outside air temperature) is outside a predetermined range and calls off the alarm and permits to start machining after the temperature of the working fluid or the outside air temperature returns to within the predetermined range and a temperature difference between the workpiece and working fluid or a temperature difference between the temperature of the electric discharge machine body and the outside air temperature disappears.

The present invention relates to a temperature monitor of a wire electric discharge machine that machines a workpiece by supplying a working fluid from a working fluid treatment equipment to a work tank where the workpiece is placed. The temperature monitor includes a working fluid temperature detector that detects a temperature of the working fluid, a working fluid temperature controller that controls the temperature of the working fluid so that the temperature of the working fluid is within a predetermined range, a working fluid temperature comparator that determines whether the detected temperature of the working fluid is within a preset allowable working fluid temperature range or not, an alarm display unit that displays an alarm when determined by the working fluid temperature comparator that the temperature of the working fluid is outside the allowable working fluid temperature range, a working fluid temperature difference disappearing time measuring unit that measures a time that has elapsed since the detected temperature of the working fluid falls within the allowable working fluid temperature range from outside the allowable working fluid temperature range, and an alarm lifting unit that calls off the alarm when a time measured by the working fluid temperature difference disappearing time measuring unit exceeds a preset working fluid temperature difference disappearing time.

The alarm display unit may change display content of the alarm when the temperature of the working fluid falls within the allowable working fluid temperature range from outside the allowable working fluid temperature range.

The temperature monitor may further include an outside air temperature detector that detects an outside air temperature as a temperature around the wire electric discharge machine, an outside air temperature controller that controls the outside air temperature so that the outside air temperature falls within the predetermined range, and an outside air temperature comparator that determines whether the outside air temperature is within an allowable outside air temperature range or not, wherein the alarm display unit may further display the alarm when, in addition to a case where the temperature of the working fluid is determined to be outside the allowable outside air temperature range by the working fluid temperature comparator, the outside air temperature is determined to be outside the allowable outside air temperature range by the outside air temperature comparator.

The temperature monitor may further include an outside air temperature difference disappearing time measuring unit that measures a time that has elapsed since the detected outside air temperature falls within the allowable outside air temperature range from outside the allowable outside air temperature range, wherein the alarm lifting unit may call off the alarm when a time that has elapsed since the detected temperature of the working fluid falls within the allowable working fluid temperature range from outside the allowable working fluid temperature range exceeds the working fluid temperature difference disappearing time and a time that has elapsed since the detected outside air temperature falls within the allowable outside air temperature range from outside the allowable outside air temperature range exceeds a preset outside air temperature difference disappearing time.

The temperature monitor may further include a storage unit that stores relationships at least among a volume, a surface area, and a material of the workpiece, a difference between the temperature when machining is started and a set temperature, and the working fluid temperature difference disappearing time, wherein the working fluid temperature difference disappearing time may be set based on the relationships stored in the storage unit.

The temperature monitor may further include an operation controller that automatically starts machining after the alarm is called off.

According to the present invention, it is possible to provide a temperature monitor of a wire electric discharge machine that inhibits machining of a workpiece from starting by displaying an alarm on the assumption that the temperature of the workpiece or the electric discharge machine body can change when the temperature of a working fluid or the temperature around the electric discharge machine (outside air temperature) is outside a predetermined range and calls off the alarm and permits to start machining after the temperature of the working fluid or the outside air temperature returns to within the predetermined range and a temperature difference between the workpiece and working fluid or a temperature difference between the temperature of the electric discharge machine body and the outside air temperature disappears.

BRIEF DESCRIPTION OF THE DRAWINGS

The above and other objects and features of the present invention will be apparent from the following description of embodiments of the invention with reference to the accompanying drawings, in which.

DETAILED DESCRIPTION OF THE PREFERRED EMBODIMENTS

A temperature monitor of a wire electric discharge machine according to the present invention displays an "alarm 1" indicating that the temperature of a working fluid or the temperature around an electric discharge machine (outside air temperature) is outside an allowable range when such a temperature is outside the allowable range to inhibit machining from starting in conditions in which the temperature of a workpiece or the electric discharge machine body can change, displays an "alarm 2" indicating a time in which a predetermined temperature difference is disappearing until a difference between the temperature of the workpiece and the temperature of the working fluid and a difference between the temperature of the electric discharge machine body and the outside air temperature disappear and after these temperature differences disappear, the alarm is called off to start electric discharge machining.

Figure 1:
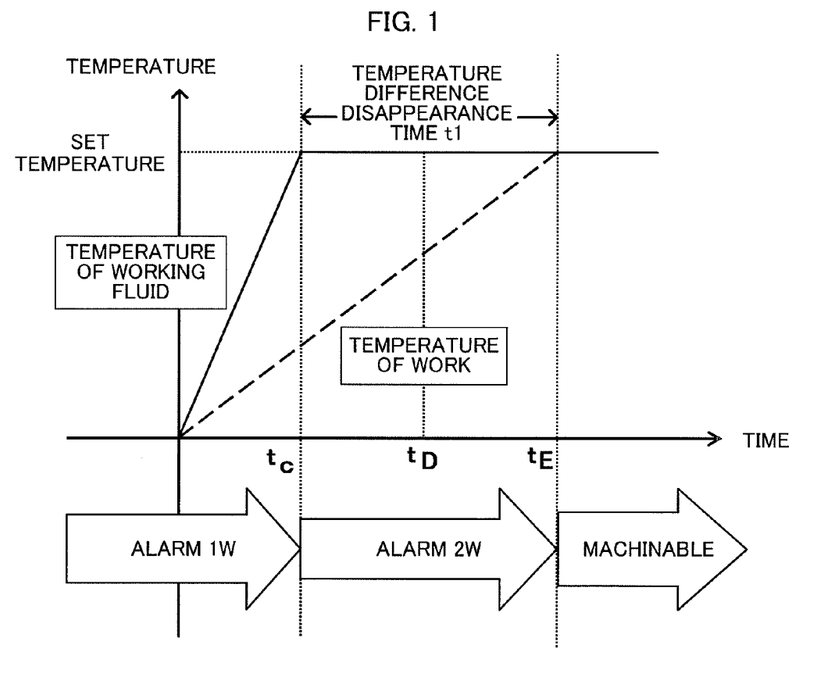
FIG. 1 is a graph illustrating the relationship between the temperature of a working fluid and the temperature of a workpiece over time.

FIG. 1 is a graph illustrating the relationship between the temperature of a working fluid and the temperature of a workpiece over time.

FIG. 1 shows the relationship between the temperature of the working fluid and the temperature of the workpiece over time by ignoring the ambient temperature of a wire electric discharge machine (outside air temperature). The temperature of the working fluid reaches the set temperature at time $t_c$ and the temperature of the workpiece reaches the set temperature at time $t_E$. Therefore, an "alarm 1W" is displayed until time $t_c$ and an "alarm 2W" is displayed between time $t_c$ and time $t_E$.

Incidentally, the relationship between the outside air temperature (ignored in FIG. 1) and the temperature of the workpiece over time can also be represented like in FIG. 1.

Figure 2:
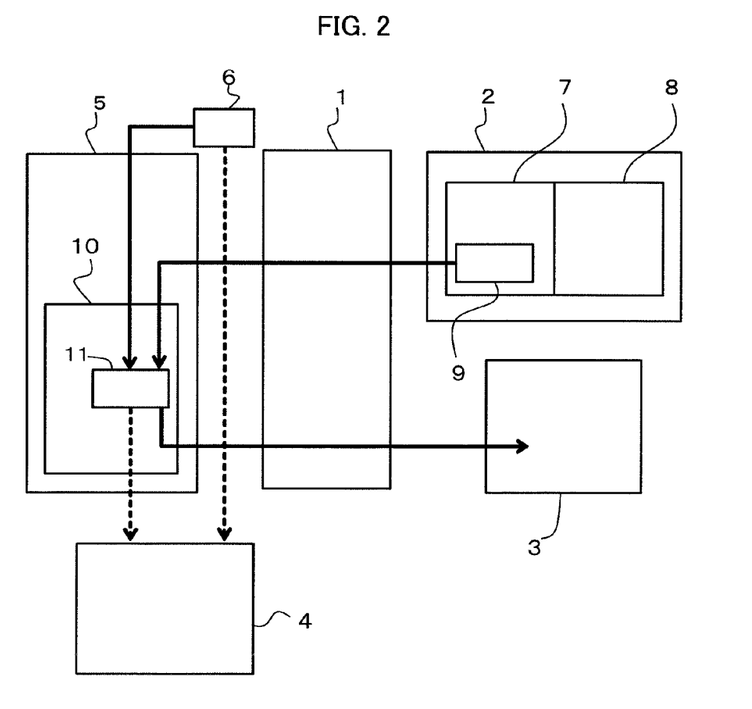
FIG. 2 is a diagram schematically showing the configuration of a wire electric discharge machine including a temperature monitor according to the present invention.

FIG. 2 is a diagram schematically showing the configuration of a wire electric discharge machine including a temperature monitor according to the present invention.

The wire electric discharge machine includes, as shown in FIG. 2, a machine body 1, a working fluid treatment tank 2, a working fluid cooling apparatus 3, an air conditioner 4, and a numerical controller (CNC) 5. The machine body 1 is connected to the numerical controller (CNC) 5 to machine a workpiece (not shown) based on command signals from the CNC 5. An outside air temperature sensor 6 is provided near the machine body 1. The outside air temperature sensor 6 is connected to a programmable machine controller (PMC) 10 contained in the CNC 5 to detect the temperature around the machine body 1 (outside air temperature TA) and to transmit a temperature detection signal thereof to the PMC 10. The numerical controller 5 includes an input apparatus with a display apparatus (not shown) and various alarms related to temperature control can be displayed on a display screen of the display apparatus. Incidentally, alarm displays may also be made by lamp displays or the like.

The working fluid treatment tank 2 is comprised of a fresh water tank 7, a foul water tank 8, and a filter (not shown) and removes impurities in the working fluid to maintain the state of the working water constant. The fresh water tank 7 is provided with a working fluid temperature sensor 9. Like the outside air temperature sensor 6, the working fluid temperature sensor 9 is connected to the PMC 10 to detect a working fluid temperature TW and to transmit a detection signal thereof to the PMC 10. The working fluid cooling apparatus 3 is connected to the PMC 10 to control the working fluid based on a signal from the PMC 10 to maintain the working fluid temperature constant.

The machine body 1, the working fluid treatment tank 2, and the working fluid cooling apparatus 3 are mutually connected by a working fluid channel (not shown) and the working fluid is always circulated by driving a working fluid pump (not shown). That is, the working fluid flows in the order of the foul water tank 8, the filter, and the fresh water tank 7 in the working fluid treatment tank 2 from the machine body 1 and is sent to the working fluid cooling apparatus 3 for cooling before being supplied to the machine body 1 again. Water or oil is used as the working fluid.

The air conditioner 4 may be connected to the PMC 10 to control the outside air temperature based on a signal from the PMC 10 or may be connected to the outside air temperature sensor 6 without being connected to the PMC 10 to control the outside air temperature based on a signal from the outside air temperature sensor 6 independently of the machine. When the outside air temperature is not particularly managed, the air conditioner 4 may not be included.

The PMC 10 contained in the CNC 5 manages the temperature of the working fluid by controlling the working fluid cooling apparatus 3 and in some cases, manages the temperature of the outside air by controlling the air conditioner 4. That is, the PMC 10 executes a temperature management program based on a detection signal from the working fluid temperature sensor 9, input into an input/output circuit 11 thereof, and sends an output signal thereof from the input/output circuit 11 to the working fluid cooling apparatus 3. In some cases, the PMC 10 executes a temperature management program based on a detection signal from the outside air temperature sensor 6, input into the input/output circuit 11, and sends an output signal thereof from the input/output circuit 11 to the air conditioner 4.

Figure 3:
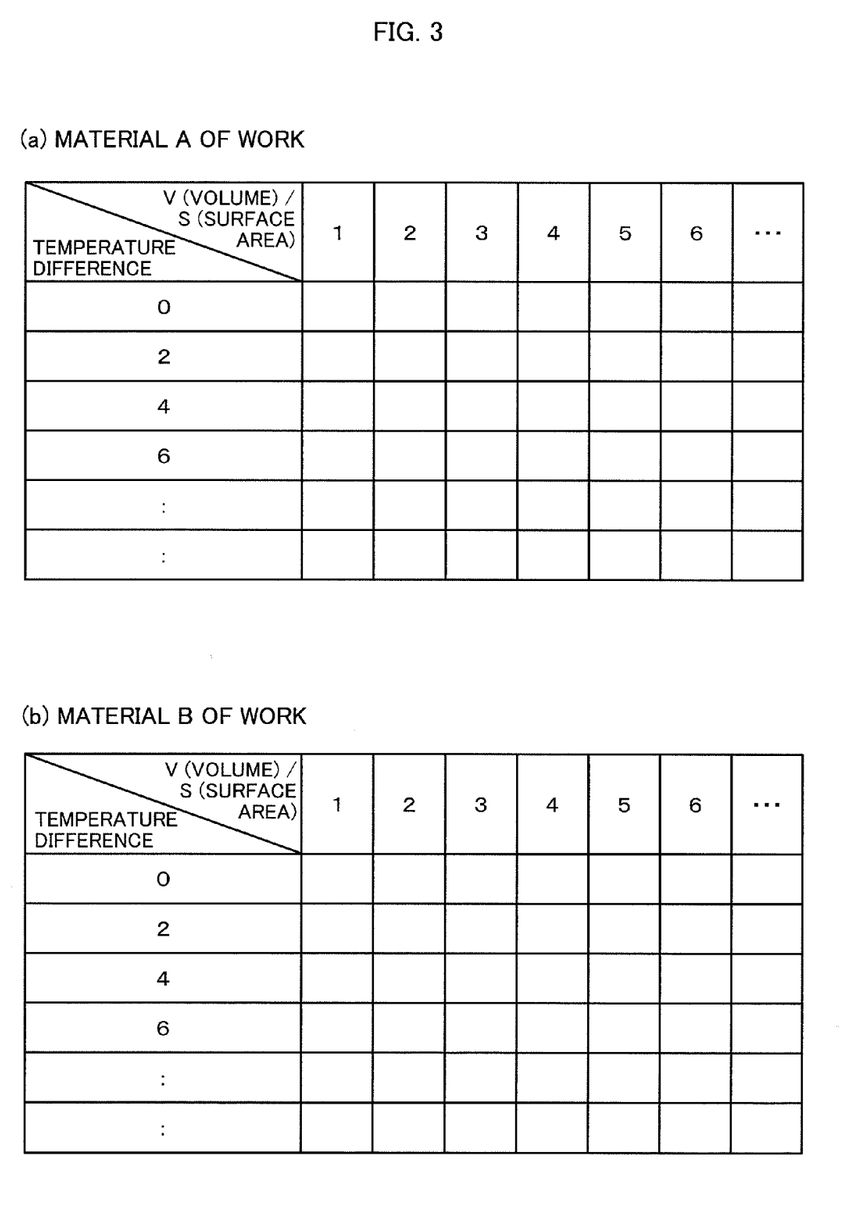
FIG. 3 is an example of a table showing the relationship between (V(volume)/S(surface area)) and a temperature difference.

In an embodiment of a temperature monitor according to the present invention, as shown in FIG. 3, a table of time required for eliminating a temperature difference between a working fluid and a workpiece may be prepared in advance to set the predetermined temperature difference disappearing time in a storage apparatus included in the numerical controller 5 in accordance with the volume, surface area, and material of the workpiece and a difference between the temperature when machining is started and a set temperature. Alternatively, the predetermined temperature difference disappearing time may also be set by other methods.

Hereinafter, the procedure for temperature control performed by a temperature monitor according to the present invention will be described by using the flow charts in FIG. 4 and subsequent figures. In the flow charts below, a predetermined temperature difference disappearing time t0 is a temperature difference disappearing time for a set outside air temperature and a predetermined temperature difference disappearing time t1 is a temperature difference disappearing time for a set working fluid temperature.

First Embodiment

Figure 4:
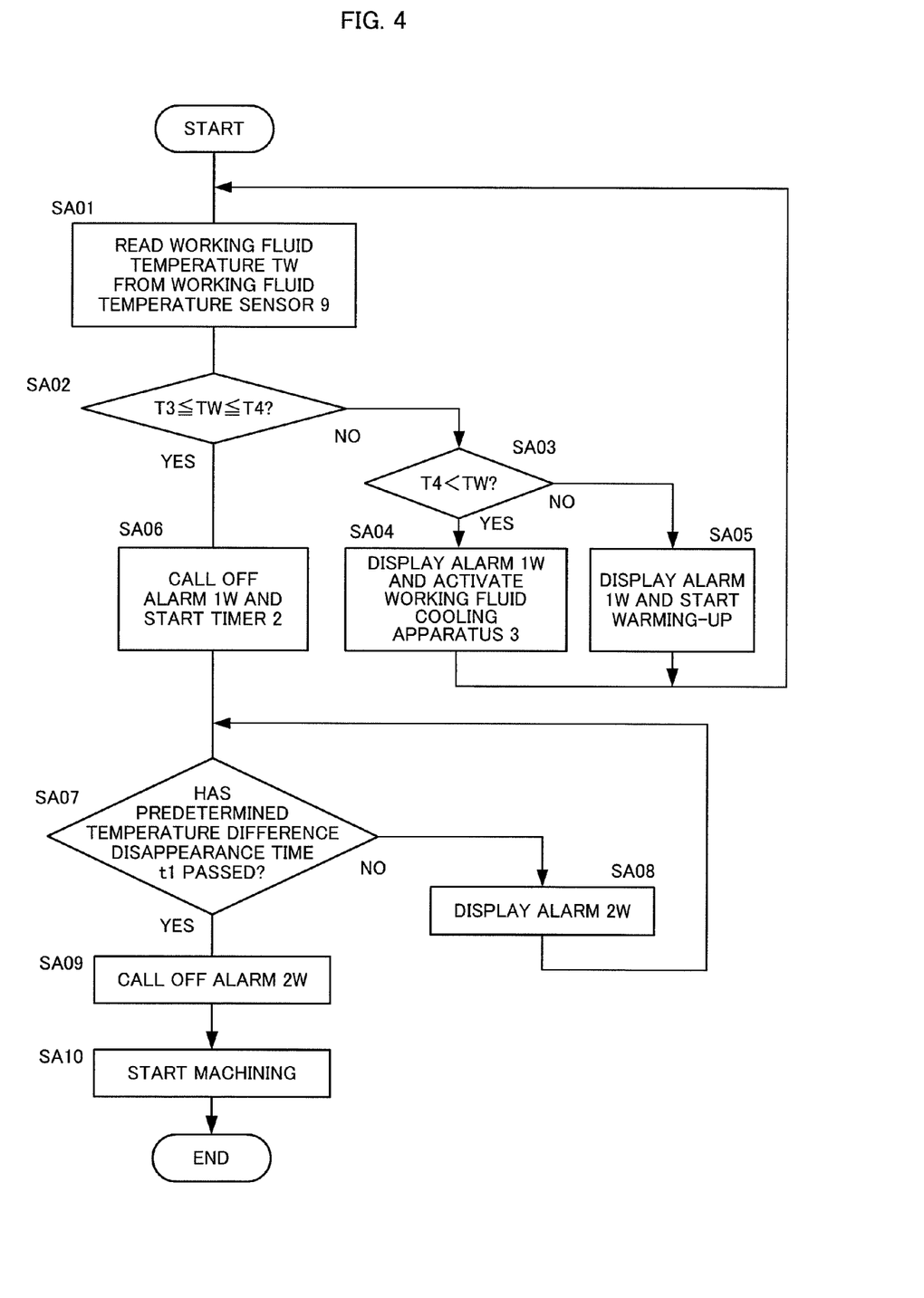
FIG. 4 is a flow chart illustrating the flow of temperature control in a temperature management program executed by a first embodiment of the temperature monitor according to the present invention.

FIG. 4 is a flow chart illustrating the flow of temperature control in a temperature management program executed by the first embodiment of the temperature monitor according to the present invention. Hereinafter, the flowchart of FIG. 4 will be described according to each step.

[Step SA01] The temperature monitor reads the working fluid temperature TW from the working fluid temperature sensor 9.

[Step SA02] The temperature monitor determines whether or not the read working fluid temperature TW is between the lowest value T3 and the highest value T4 of the set working fluid temperature allowable range (that is, determine whether the working fluid temperature TW is within the set working fluid temperature allowable range or not). The process proceeds to step SA06 if the working fluid temperature TW is within the working fluid temperature allowable range (T3≤TW≤T4) (YES), whereas process proceeds to step SA03 if the working fluid temperature TW is not within the working fluid temperature allowable range (NO).

[Step SA03] The temperature monitor determines whether the working fluid temperature TW read in step SA01 is higher than the highest value T4 of the working fluid temperature allowable range or not. The process proceeds to step SA04 if the working fluid temperature TW is higher than the highest value T4 (T4<TW) of the working fluid temperature allowable range (YES), whereas the process proceeds to step SA05 if the working fluid temperature TW is not higher than the highest value T4 (NO).

[Step SA04] The temperature monitor notifies that the working fluid temperature TW is higher than the highest value T4 of the working fluid temperature allowable range by displaying the alarm 1W and starts to cool the working fluid by activating the working fluid cooling apparatus 3, and then the process returns to step SA01.

[Step SA05] The temperature monitor notifies that the working fluid temperature TW is lower than the lowest value T3 of the temperature allowable range by displaying the alarm 1W and performs warming-up by activating a pump which causes the working fluid to circulate, thereby starting control that raises the working fluid temperature TW, and then the process returns to step SA01.

[Step SA06] The temperature monitor calls off the alarm 1W and starts a timer 2. The timer 2 is a timer which measures a time that has elapsed since the working fluid temperature TW falls within the working fluid temperature allowable range (T3≤TW≤T4).

[Step SA07] The temperature monitor determines whether or not the predetermined temperature difference disappearing time t1 for the set working fluid temperature has passed after it determines that the working fluid temperature TW is within the working fluid temperature allowable range (T3≤TW≤T4) in step SA02 (that is, after the timer 2 is started in step SA06). The process proceeds to step SA09 if the predetermined temperature difference disappearing time t1 has passed, whereas the process proceeds to step SA08 if the predetermined temperature difference disappearing time t1 has not passed.

[Step SA08] (Because the predetermined temperature difference disappearing time t1 has not passed after starting the timer in step SA06), the temperature monitor notifies that the temperature difference with respect to the working fluid temperature has not disappeared by displaying the alarm 2W, and the process returns to step SA07. That is, the temperature monitor waits until the predetermined temperature difference disappearing time t1 with respect to the set working fluid temperature passes while controlling the working fluid temperature TW to within the working fluid temperature allowable range (T3≤TW≤T4).

[Step SA09] The temperature monitor calls off the alarm 2W.

[Step SA10] The temperature monitor starts machining to finish the machining by judging that the working fluid temperature TW is controlled to within the working fluid temperature allowable range (T3≤TW≤T4) and the workpiece has adjusted to the environment within the working fluid temperature allowable range (T3≤TW≤T4) in the predetermined temperature difference disappearing time t1.

The machining of the above flow chart in FIG. 4 will supplementarily be described.

In steps SA04 and SA05 after step SA03, respective flags indicating the activation of the working fluid cooling apparatus and the start of warming-up are allocated. In the second iteration of steps SA04 and SA05 after returning to SA01 from step SA04 or step SA05, the activation of the working fluid cooling apparatus 3 and the start of warming-up can be controlled by checking whether these flags are 1 or 0.

In steps SA07 and SA08, the working fluid temperature TW is controlled to within the working fluid temperature allowable range (T3≤TW≤T4) until the predetermined temperature difference disappearing time t1 with respect to the set working fluid temperature passes.

The control after the activation of the working fluid cooling apparatus 3 and the circulating pump for warming-up will continue so that the working fluid temperature TW is maintained within the working fluid temperature allowable range (T3≤TW≤T4).

Second Embodiment

Figure 5A:
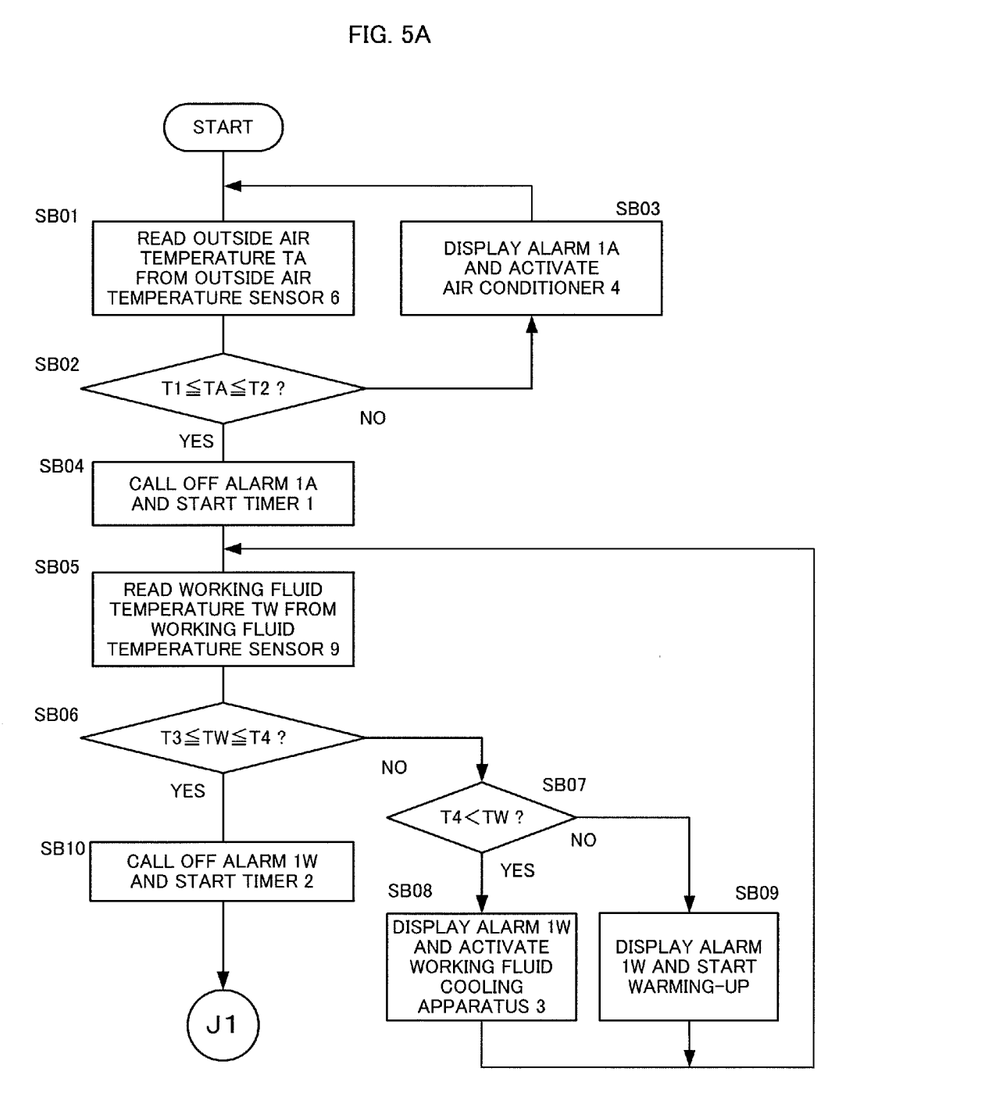
FIGS. 5A and 5B are flow charts illustrating the flow of temperature control in the temperature management program executed by a second embodiment of the temperature monitor according to the present invention.
Figure 5B:
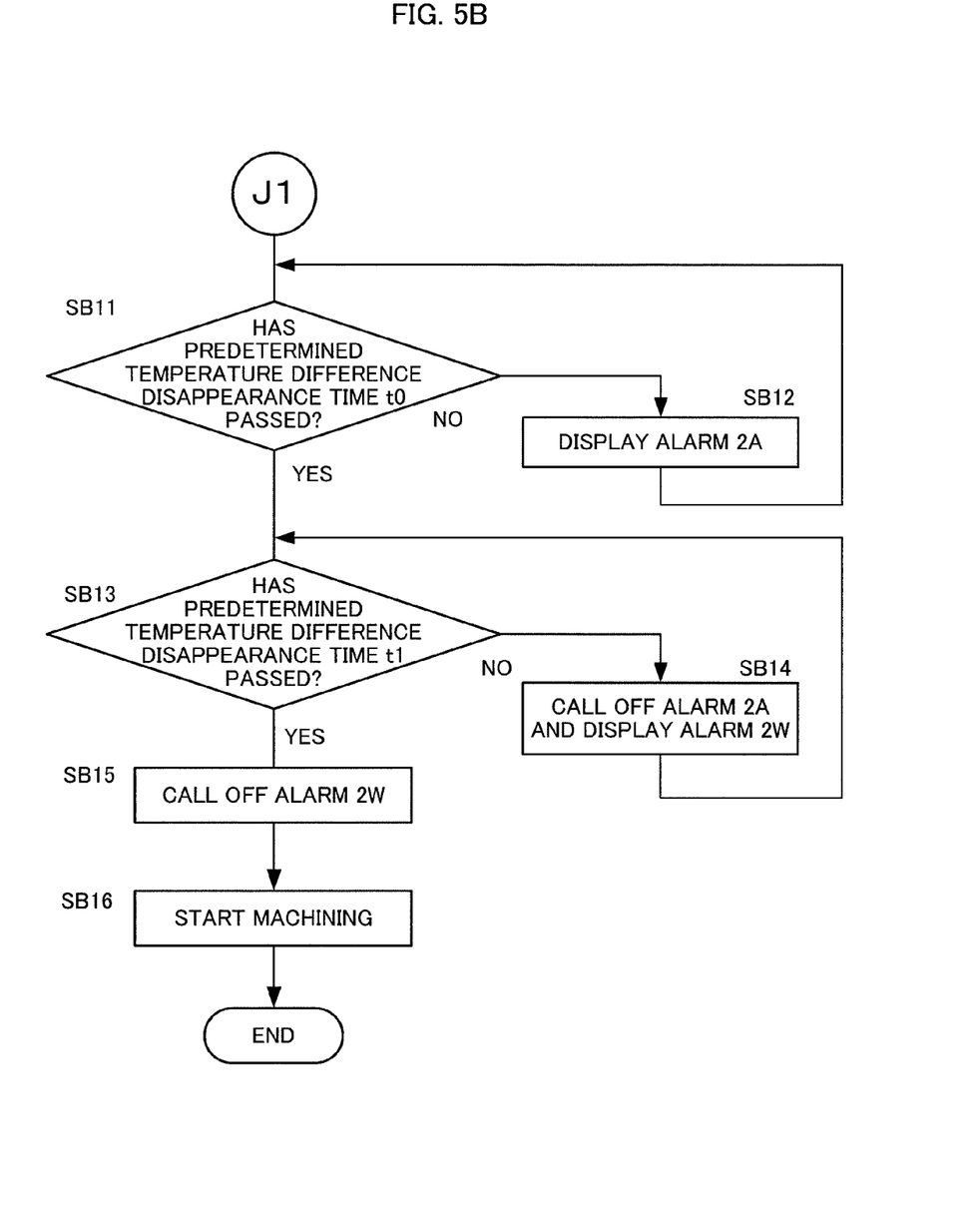

FIGS. 5A and 5B are flow charts illustrating the flow of temperature control in the temperature management program executed by the second embodiment of the temperature monitor according to the present invention. Hereinafter, the flowcharts of FIGS. 5A and 5B will be described according to each step.

[Step SB01] The temperature monitor reads the outside air temperature TA from the outside air temperature sensor 6.

[Step SB02] The temperature monitor determines whether or not the read working fluid temperature TA is between a lowest value T1 and a highest value T2 of a set outside air temperature allowable range (that is, determines whether the working fluid temperature TA is within the set outside air temperature allowable range or not). The process proceeds to step SB04 if the outside air temperature TA is within the outside air temperature allowable range (T1≤TA≤T2) (YES), whereas the process proceeds to step SB03 if the outside air temperature TA is not within the outside air temperature allowable range (NO).

[Step SB03] The temperature monitor notifies that the outside air temperature TA is not within the outside air temperature allowable range (T1≤TA≤T2) (that is, notifies that the outside air temperature TA is too high or too low) by displaying an alarm 1A and activate the air conditioner 4 to control the outside air temperature TA.

[Step SB04] The temperature monitor calls off the alarm 1A and starts a timer 1. The timer 1 is a timer which measures a time that has elapsed since the outside air temperature TA falls within the outside air temperature allowable range (T1≤TW≤T2).

[Step SB05] The temperature monitor reads the working fluid temperature TW from the working fluid temperature sensor 9.

[Step SB06] The temperature monitor determines whether or not the read working fluid temperature TW is between the lowest value T3 and the highest value T4 of the set working fluid temperature allowable range (that is, whether the working fluid temperature TW is within the set working fluid temperature allowable range or not). The process proceeds to step SB10 if the working fluid temperature TW is within the working fluid temperature allowable range (T3≤TW≤T4) (YES), whereas the process proceeds to step SB07 if the working fluid temperature TW is not within the working fluid temperature allowable range (NO).

[Step SB07] The temperature monitor determines whether the working fluid temperature TW read in step SB05 is higher than the highest value T4 of the working fluid temperature allowable range or not. The process proceeds to step SB08 if the working fluid temperature TW is higher than the highest value T4 (T4<TW) of the working fluid temperature allowable range (YES), whereas the process proceeds to step SB09 if the working fluid temperature TW is not higher than the highest value T4 of the working fluid temperature allowable range (NO).

[Step SB08] The temperature monitor notifies that the working fluid temperature TW is higher than the highest value T4 of the working fluid temperature allowable range by displaying the alarm 1W and start to cool the working fluid by activating the working fluid cooling apparatus 3, and the process returns to step SB05.

[Step SB09] The temperature monitor notifies that the working fluid temperature TW is lower than the lowest value T3 of the temperature allowable range by displaying the alarm 1W and performs warming-up by activating a pump which causes the working fluid to circulate, thereby starting control that raises the working fluid temperature TW, and then the process returns to step SB05.

[Step SB10] The temperature monitor calls off the alarm 1W and starts the timer 2. The timer 2 is a timer which measures a time that has elapsed since the working fluid temperature TW falls within the working fluid temperature allowable range (T3≤TW≤T4).

[Step SB11] The temperature monitor determines whether or not the predetermined temperature difference disappearing time t0 for the set outside air temperature has passed after it determines that the outside air temperature TA is within the outside air temperature allowable range (T1≤TA≤T2) in step SB02 (that is, after the timer 1 is started in step SB04). The process proceeds to step SB13 if the predetermined temperature difference disappearing time t0 has passed, whereas the process proceeds to step SB12 if the predetermined temperature difference disappearing time t0 has not passed.

[Step SB12] The temperature monitor displays an alarm 2A, and the process returns to step SB11.

[Step SB13] The temperature monitor determines whether or not the predetermined temperature difference disappearing time t1 for the set working fluid temperature has passed after it determines that the working fluid temperature TW is within the working fluid temperature allowable range (T3≤TW≤T4) in step SB06 (that is, after the timer 2 is started in step SB10). The process proceeds to step SB15 if the predetermined temperature difference disappearing time t1 has passed, whereas the process proceeds to step SB14 if the predetermined temperature difference disappearing time t1 has not passed.

[Step SB14] The temperature monitor calls off the alarm 2A and displays the alarm 2W, and the process returns to step SB13.

[Step SB15] The temperature monitor calls off the alarm 2W.

[Step SB16] The temperature monitor starts machining to finish the machining by judging that the outside air temperature TA is controlled to within the outside air temperature allowable range (T1≤TA≤T2), the working fluid temperature TW is controlled to within the working fluid temperature allowable range (T3≤TW≤T4), the outside air temperature TA has passed the predetermined time within the outside air temperature allowable range (T1≤TA≤T2), and the workpiece has adjusted to the environment in which the working fluid temperature is within the working fluid temperature allowable range (T3≤TW≤T4) in the predetermined time.

The control after the activation of the working fluid cooling apparatus 3 and the circulating pump (not shown) for warming-up will continue so that the working fluid temperature TW is maintained within the working fluid temperature allowable range (T3≤TW≤T4).

Third Embodiment

Figure 6:
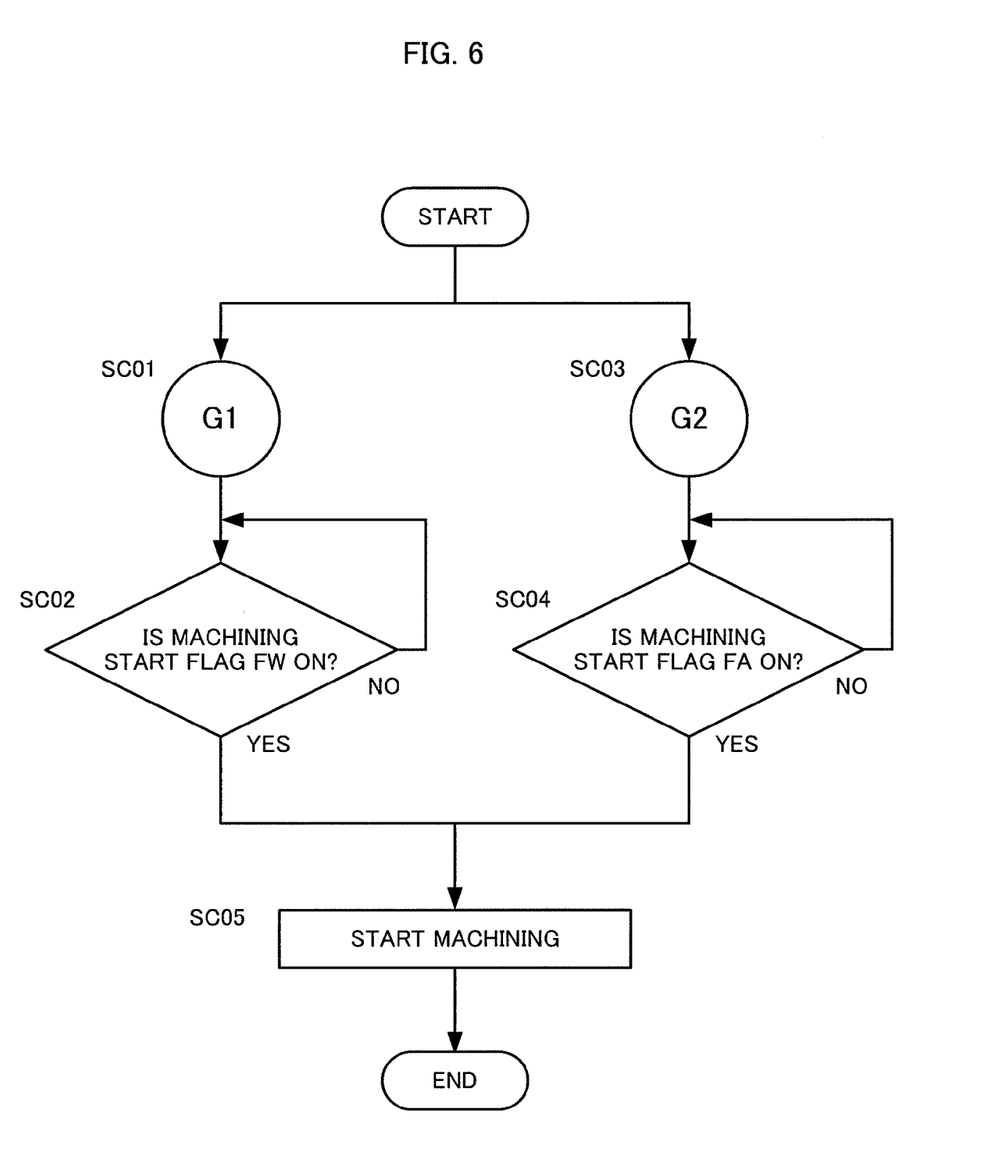
FIG. 6 is a flow chart illustrating the flow of temperature control according to a third embodiment of the present invention.
Figure 7:
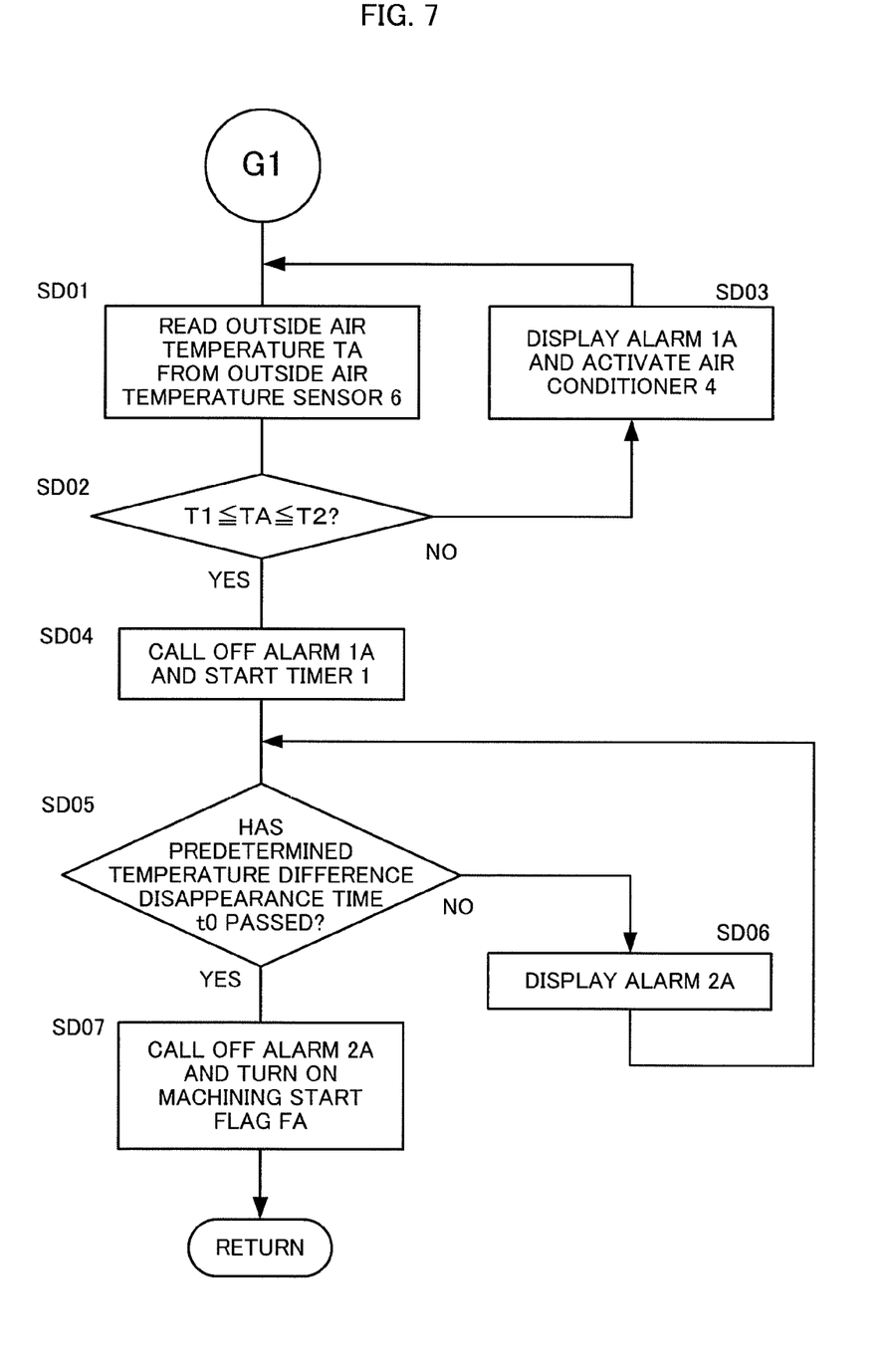
FIG. 7 is a flow chart illustrating the flow of control of an outside air temperature in FIG. 6.
Figure 8:
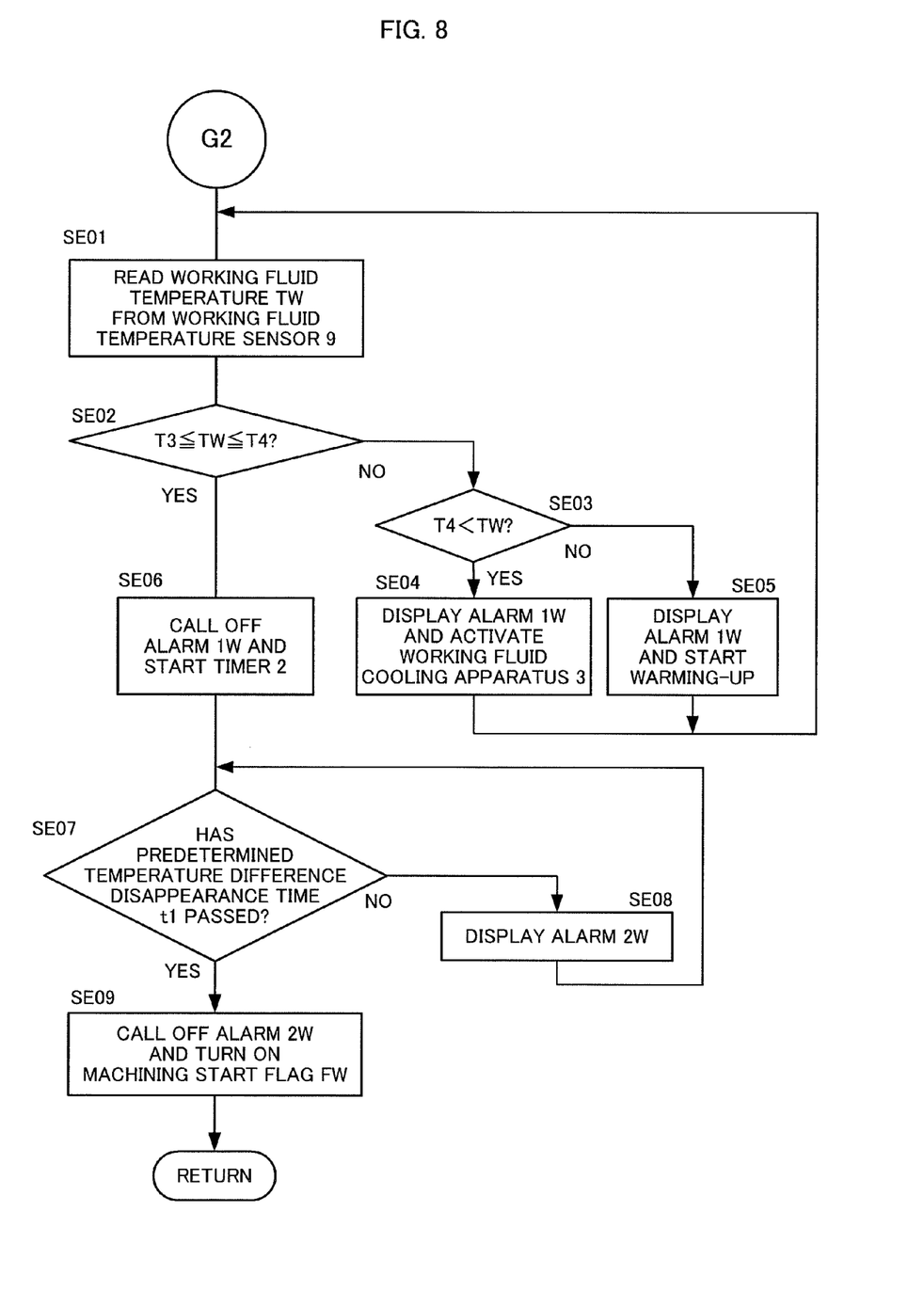
FIG. 8 is a flow chart illustrating the flow of control of the working fluid temperature in FIG. 6.

FIG. 6 is a flow chart illustrating the flow of temperature control in the temperature management program executed by the third embodiment of the temperature monitor according to the present invention. FIG. 7 is a flow chart illustrating the flow of control of the outside air temperature in FIG. 6. FIG. 8 is a flow chart illustrating the flow of control of the working fluid temperature in FIG. 6.

First, the flowchart of FIG. 6 will be described according to each step. Each flag is set to OFF as the initial setting.

[Step SC01] The temperature monitor executes a control program of the outside air temperature indicated by G1 (see FIG. 7) and a control program of a machining temperature indicated by G2 (see FIG. 8) at the same time.

[Step SC02] The temperature monitor determines whether a machining start flag FW is ON or not, and the process proceeds to step SC05 after waiting until the machining start flag FW becomes ON.

[Step SC03] The temperature monitor executes the control program of G2 and the control program of G1 at the same time, as described in step SC01.

[Step SC04] The temperature monitor determines whether a machining start flag FA is ON or not, and the process proceeds to step SC05 after waiting until the machining start flag FW becomes ON.

[Step SC05] The temperature monitor starts machining.

FIG. 7 is a flow chart illustrating the flow of the control program G1 of the outside air temperature executed in step SC01 of the flow chart in FIG. 6. Hereinafter, the flowchart of FIG. 7 will be described according to each step. Each flag is set to OFF as the initial setting.

[Step SD01] The temperature monitor reads the outside air temperature TA from the outside air temperature sensor 6.

[Step SD02] The temperature monitor determines whether or not the read working fluid temperature TA is between the lowest value T1 and the highest value T2 of the set outside air temperature allowable range (T1≤TA≤T2) (that is, whether the working fluid temperature TA is within the set outside air temperature allowable range or not). The process proceeds to step SD04 if the outside air temperature TA is within the outside air temperature allowable range (T1≤TA≤T2) (YES), whereas the process proceeds to step SD03 if the outside air temperature TA is not within the outside air temperature allowable range (NO).

[Step SD03] The temperature monitor notifies that the outside air temperature TA is not within the outside air temperature allowable range (T1≤TA≤T2) (that is, notifies that the outside air temperature TA is too high or too low) by displaying an alarm 1A and activates the air conditioner 4 to control the outside air temperature TA.

[Step SD04] The temperature monitor calls off the alarm 1A and starts the timer 1. The timer 1 is a timer which measures a time that has elapsed since the outside air temperature TA falls within the outside air temperature allowable range (T1≤TA≤T2).

[Step SD05] The temperature monitor determines whether or not the predetermined temperature difference disappearing time t0 for the set outside air temperature has passed after it determines that the outside air temperature TA is within the outside air temperature allowable range (T1≤TA≤T2) in step SD02 (that is, after the timer 1 is started in step SD04). The process proceeds to step SD07 if the predetermined temperature difference disappearing time t0 has passed, whereas the process proceeds to step SD06 if the predetermined temperature difference disappearing time t0 has not passed.

[Step SD06] The temperature monitor displays the alarm 2A, and the process returns to step SD05.

[Step SD07] The temperature monitor calls off the alarm 2A and turns on the machining start flag FA, and then the process returns to the processing shown in FIG. 6.

FIG. 8 is a flow chart illustrating the flow of the control program G2 of the working fluid temperature executed in step SC03 of the flow chart in FIG. 6. Hereinafter, the flowchart of FIG. 8 will be described according to each step. Each flag is set to OFF as the initial setting.

[Step SE01] The temperature monitor reads the working fluid temperature TW from the working fluid temperature sensor 9.

[Step SE02] The temperature monitor determines whether or not the read working fluid temperature TW is between the lowest value T3 and the highest value T4 of the set working fluid temperature allowable range (that is, whether the working fluid temperature TW is within the set working fluid temperature allowable range or not). The process proceeds to step SE06 if the working fluid temperature TW is within the working fluid temperature allowable range (T3≤TW≤T4) (YES), whereas the process proceeds to step SE03 if the working fluid temperature TW is not within the working fluid temperature allowable range (NO).

[Step SE03] The temperature monitor determines whether or not the working fluid temperature TW read in step SE01 is higher than the highest value T4 of the set working fluid temperature allowable range. The process proceeds to step SE04 if the working fluid temperature TW is higher than the highest value (T4<TW) of the working fluid temperature allowable range (YES), whereas the process proceeds to step SE05 if the working fluid temperature TW is not higher than the highest value (NO).

[Step SE04] The temperature monitor notifies that the working fluid temperature TW is higher than the highest value T4 of the working fluid temperature allowable range by displaying the alarm 1W and starts to cool the working fluid by activating the working fluid cooling apparatus 3, and the process returns to step SE01.

[Step SE05] The temperature monitor notifies that the working fluid temperature TW is lower than the lowest value T3 of the temperature allowable range by displaying the alarm 1W and performs warming-up by activating a pump which causes the working fluid to circulate, thereby starting control that raises the working fluid temperature TW, and then the process returns to step SE01.

[Step SE06] The temperature monitor calls off the alarm 1W and starts the timer 2. The timer 2 is a timer which measures a time that has elapsed since the working fluid temperature TW falls within the working fluid temperature allowable range (T3≤TW≤T4).

[Step SE07] The temperature monitor determines whether or not the predetermined temperature difference disappearing time t1 for the set working fluid temperature has passed after it determines that the working fluid temperature TW is within the working fluid temperature allowable range (T3≤TW≤T4) in step SE02 (that is, after the timer 2 is started in step SE06). The process proceeds to step SE09 if the predetermined temperature difference disappearing time t1 has passed, whereas the process proceeds to step SE08 if the predetermined temperature difference disappearing time t1 has not passed.

[Step SE08] (Because the predetermined temperature difference disappearing time t1 has not passed after starting the timer in step SE06), the temperature monitor notifies that the temperature difference with respect to the working fluid temperature has not disappeared by displaying the alarm 2W, and then the process returns to step SE07. That is, the temperature monitor waits until the predetermined temperature difference disappearing time t1 with respect to the set working fluid temperature passes while controlling the working fluid temperature TW to within the working fluid temperature allowable range (T3≤TW≤T4).

[Step SE09] The temperature monitor calls off the alarm 2W and turns on the machining start flag FW, and then the process returns to the machining shown in FIG. 6.

According to the present invention, as described above, an alarm is displayed and machining is not started when the outside air temperature TA or the working fluid temperature TW is outside the respective set allowable temperature range, and after both the outside air temperature TA and the working fluid temperature TW are within the set allowable temperature ranges, machining is started after a temperature difference between the machine body or workpiece and the outside air or working fluid disappears at the temperature. Therefore, defective machining due to temperature changes will not occur so that machining with high precision can be achieved.

The invention claimed is:

1. A temperature monitor of a wire electric discharge machine that machines a workpiece by supplying a working fluid from a working fluid treatment equipment to a work tank where the workpiece is placed, comprising:
    a working fluid temperature detector that detects a temperature of the working fluid;
    a working fluid temperature controller that controls the temperature of the working fluid so that the temperature of the working fluid is within a predetermined range;
    a working fluid temperature comparator that determines whether the detected temperature of the working fluid is within a preset allowable working fluid temperature range or not;
    an alarm display unit that displays an alarm when determined by the working fluid temperature comparator that the temperature of the working fluid is outside the allowable working fluid temperature range;
    a working fluid temperature difference disappearing time measuring unit that measures a time that has elapsed since the detected temperature of the working fluid falls within the allowable working fluid temperature range from outside the allowable working fluid temperature range; and
    an alarm lifting unit that calls off the alarm when a time measured by the working fluid temperature difference disappearing time measuring unit exceeds a preset working fluid temperature difference disappearing time.

2. The temperature monitor of a wire electric discharge machine according to claim 1, wherein the alarm display unit changes display content of the alarm when the temperature of the working fluid falls within the allowable working fluid temperature range from outside the allowable working fluid temperature range.

3. The temperature monitor of a wire electric discharge machine according to claim 1, further comprising:
    an outside air temperature detector that detects an outside air temperature as a temperature around the wire electric discharge machine;
    an outside air temperature controller that controls the outside air temperature so that the outside air temperature falls within the predetermined range; and
    an outside air temperature comparator that determines whether the outside air temperature is within an allowable outside air temperature range or not, wherein
    the alarm display unit further displays the alarm when, in addition to a case where the temperature of the working fluid is determined to be outside the allowable outside air temperature range by the working fluid temperature comparator, the outside air temperature is determined to be outside the allowable outside air temperature range by the outside air temperature comparator.

4. The temperature monitor of a wire electric discharge machine according to claim 3, further comprising:
    an outside air temperature difference disappearing time measuring unit that measures a time that has elapsed since the detected outside air temperature falls within the allowable outside air temperature range from outside the allowable outside air temperature range, wherein
    the alarm lifting unit calls off the alarm when a time that has elapsed since the detected temperature of the working fluid falls within the allowable working fluid temperature range from outside the allowable working fluid temperature range exceeds the working fluid temperature difference disappearing time and a time that has elapsed since the detected outside air temperature falls within the allowable outside air temperature range from outside the allowable outside air temperature range exceeds a preset outside air temperature difference disappearing time.

5. The temperature monitor of a wire electric discharge machine according to claim 1, further comprising:
    a storage unit that stores relationships at least among a volume, a surface area, and a material of the workpiece, a difference between the temperature when machining is started and a set temperature, and the working fluid temperature difference disappearing time, wherein
    the working fluid temperature difference disappearing time is set based on the relationships stored in the storage unit.

6. The temperature monitor of a wire electric discharge machine according to claim 1, further comprising:
    an operation controller that automatically starts machining after the alarm is called off.

* * * * *